United States Patent
Gehman et al.

(10) Patent No.: US 7,136,881 B2
(45) Date of Patent: Nov. 14, 2006

(54) METHOD AND SYSTEM FOR PROCESSING DIRECTORY EVENTS

(75) Inventors: Byron C. Gehman, Cedar Park, TX (US); David G. Robinson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 996 days.

(21) Appl. No.: 09/738,368

(22) Filed: Dec. 15, 2000

(65) Prior Publication Data

US 2002/0078256 A1 Jun. 20, 2002

(51) Int. Cl.
*G06F 17/30* (2006.01)

(52) U.S. Cl. .................. 707/204; 707/202; 707/203

(58) Field of Classification Search .......... 707/10, 707/100, 102, 209, 202, 1–104.1, 103 R, 707/218, 230; 714/5, 42, 25; 709/229, 226, 709/217

See application file for complete search history.

(56) References Cited

U.S. PATENT DOCUMENTS

| | | | |
|---|---|---|---|
| 5,819,020 A * | 10/1998 | Beeler, Jr. | 714/5 |
| 5,924,096 A * | 7/1999 | Draper et al. | 707/10 |
| 6,052,724 A * | 4/2000 | Willie et al. | 709/223 |
| 6,098,099 A * | 8/2000 | Ellesson et al. | 709/223 |
| 6,192,408 B1 * | 2/2001 | Vahalia et al. | 709/229 |
| 6,247,017 B1 * | 6/2001 | Martin | 707/102 |
| 6,249,883 B1 * | 6/2001 | Cassidy et al. | 714/42 |
| 6,446,077 B1 * | 9/2002 | Straube et al. | 707/103 Y |
| 6,510,450 B1 * | 1/2003 | Ricart et al. | 709/203 |
| 6,615,223 B1 * | 9/2003 | Shih et al. | 707/201 |
| 2002/0042830 A1 * | 4/2002 | Bose et al. | 709/230 |

\* cited by examiner

*Primary Examiner*—Jeffrey Gaffin
*Assistant Examiner*—Neveen Abel-Jalil
(74) *Attorney, Agent, or Firm*—Cardinal Law Group

(57) ABSTRACT

A directory event system for providing timely event notifications of each corresponding data replication of a master directory database to a replicate directory database includes an event master server, one or more event service servers, and one or more event client servers. For an event client server having directory clients in electrical communication with the replicate directory database, the event master server provides an event message to an event service server in response to the data manipulation of the master directory database by a directory service provider server. The event message includes the event notification and the sequence number, and the event service server provides the event notification to the event client server upon a replication of the sequence number within the replicate directory database. The replicate directory clients can poll the replicate directory database for the manipulated data upon receipt of the event notification from the event client server.

6 Claims, 5 Drawing Sheets

METHOD AND SYSTEM FOR PROCESSING DIRECTORY EVENTS

BACKGROUND OF THE INVENTION

1. Field of the Invention

The present invention generally relates to the management of directory events, and more particularly relates to the synchronization and ordering of directory events in a highly distributed directory environment.

2. Description of the Related

A directory service provider server controls any manipulation of data stored within a master directory database as requested by a directory client. For each data manipulation, the directory service provider server transmits an event notification describing the data manipulation to all directory clients. The performance of the directory service provider server an manipulating daut stared withip the master directory database in accordance with numerous received requests from one or mare directory clients can be impeded as the directory service provider server concurrently attempts to transmit corresponding event notifications to all of the directory clients. This is particularly true when the directory service provider server is also receiving new data manipulation requests from directory clients.

Also, in a highly distributed environment where numerous directory clients have registered to receive directory events, the processing overhead for event notification by the directory service provider server can become significant. This will not only affect the directory service provider server's processing of event notifications, but potentially other processes in the environment as well.

Additionally, transmission of an event notification by the directory service provider server to a directory client can arrive to the directory client a significant amount of time before the manipulated data has been replicated by the master directory database in all replicate directory databases. A directory client may therefore futilely attempt to access a corresponding replicate directory database for the manipulated data prior to the master directory database's replication of the manipulated data into that particular replicate directory database.

The computer industry is therefore continually striving to improve upon the processing of directory events in a distributed environment.

SUMMARY OF THE INVENTION

One form of the present invention is a directory event method. A directory service provider server is operated to perform a data manipulation within a master directory database. An event master server is operated to assign a sequence number to the data manipulation, and to store the sequence number within the master directory database.

A second form of the present invention is a directory event system comprising a master directory database, a directory service provider server, and a event master server. The master directory database is operable to store data. The directory service provider server is operable to manipulate the data. The event master server is operable to assign a sequence number to any manipulation of the data within the master directory database by the directory service provider server.

A third form of the present invention is a computer program product in a computer useable medium. The computer program product comprises a means for monitoring a first queue for a modified message; a means for assigning a first sequence number to said modified message when said modified message is within said first queue; a means for storing said first sequence number within a master directory database; and a means for providing an event message including said first sequence number and an event notification.

The foregoing forms and other forms, features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1A:
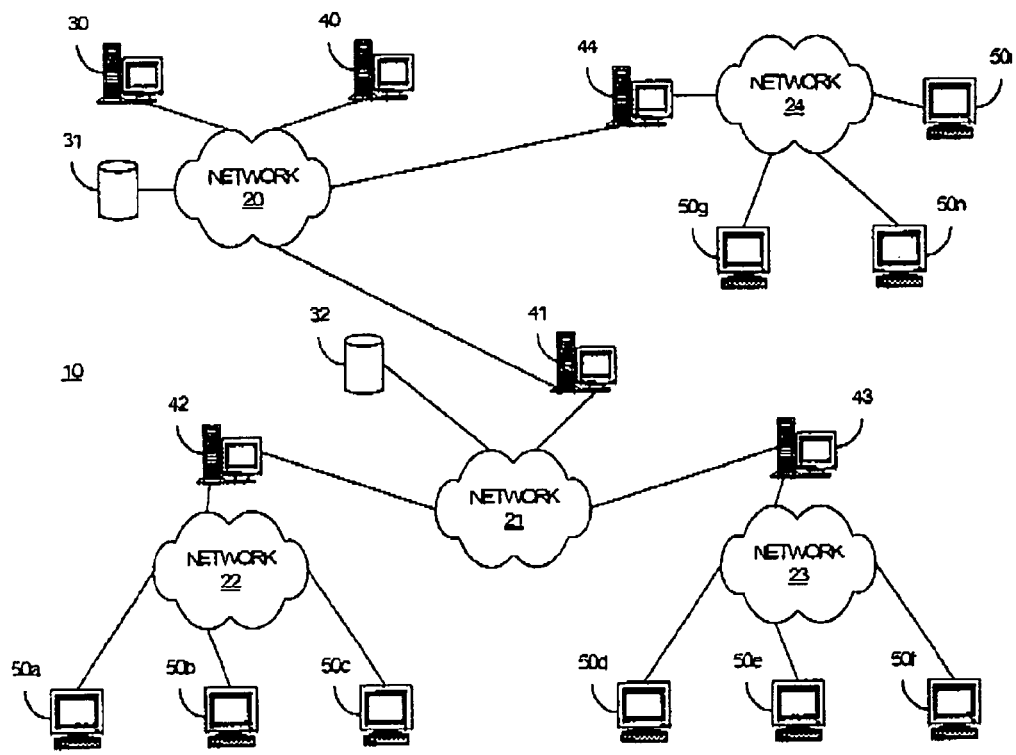
FIG. 1A is schematic diagram of network of distributed data processing systems in accordance with the present invention.

With reference now to the figures, FIG. 1A depicts a network of data processing systems. Distributed data processing system 10 contains a network 20, a network 21, a network 22, a network 23, and a network 24, which are the media used to provide communications links between various devices and computers connected together within distributed data processing system 10. Network 20, network 21, network 22, network 23, and network 24 may include permanent connections, such as wire or fiber optic cables, or temporary connections made through telephone or wireless communications.

In the depicted example, a directory service provider server 30, an event master server 40, an event service server 41, and an event client server 44 are connected to network 20 along with a master directory database 31. Event service server 41, an event client 42 and an event client 43 are connected to network 21 along with a replicate directory database 32. Event client 42, a directory client 50a, a directory client 50b, and a directory client 50c are connected to network 22. Event client 43, a directory client 50d, a directory client 50e, and a directory client 50f are connected to network 23. Event client server 44, a directory client 50g, a directory client 50h, and a directory client 50i are connected to network 24. Directory clients 50a–50f are in electrical communication with replicate directory database 32, and directory clients 50g–50i are in electrical communication with master directory database 31.

Servers 30 and 40–43, and clients 50a–50i may be represented by a variety of computing devices, such as mainframes, personal computers, personal digital assistants (PDAs), etc. Distributed data processing system 10 may includes additional servers, clients, networks, routers, and other devices not shown.

Distributed data processing system 10 may include the Internet with network 20, network 21, network 22, network 23 and network 24 representing a worldwide collection of networks and gateways that use the TCP/IP suite of protocols to communicate with one another. Of course, distributed data processing system 10 may also include a number of different types of networks, such as, for example, an intranet, a local area network (LAN), or a wide area network (WAN).

The present invention could be implemented on a variety of hardware platforms. FIG. 1A is intended as an example of a heterogeneous computing environment and not as an architectural limitation for the present invention.

Figure 1B:
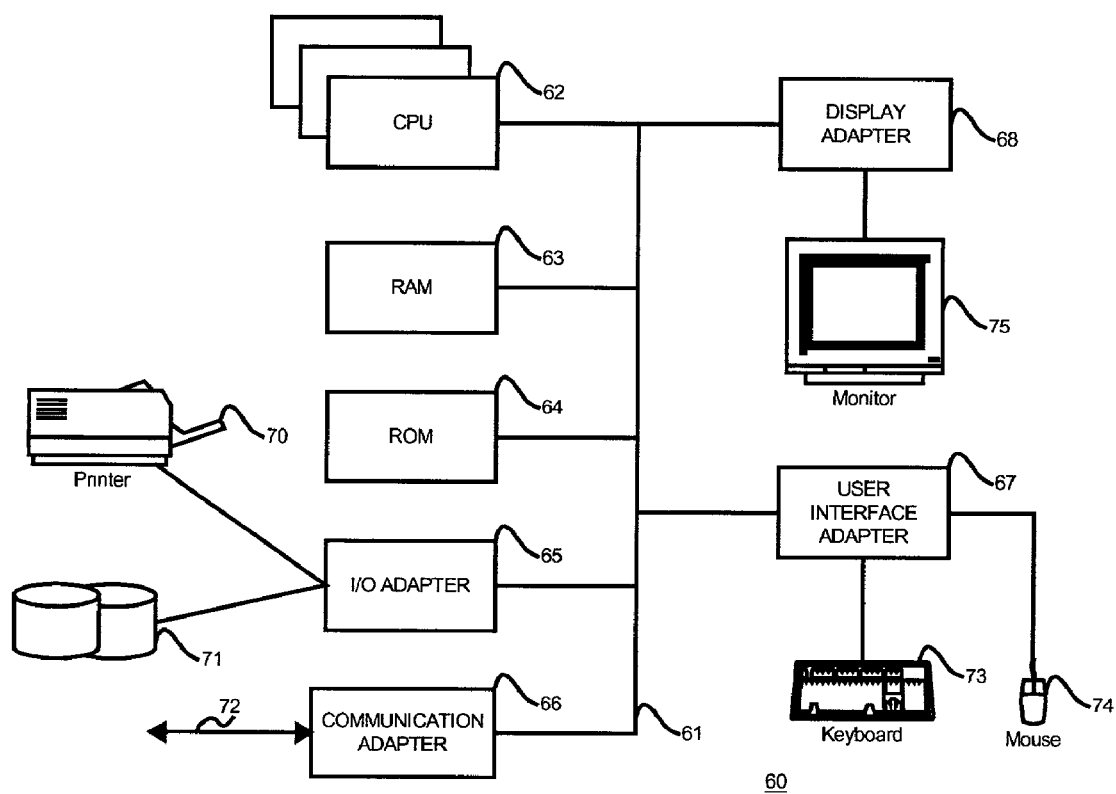
FIG. 1B is a schematic diagram of a computer architecture of a data processing system as known in the art.

With reference now to FIG. 1B, a diagram depicts typical computer architecture of a data processing system, such as those shown in FIG. 1A, in which the present invention may be implemented. Data processing system 60 contains one or more central processing units (CPUs) 62 connected to internal system bus 61, which interconnects random access memory (RAM 63, read-only memory (ROM) 64, and input/output adapter 65, which supports various I/O devices, such as printer 70, disk units 71, or other devices not shown, such as a sound system, etc. A communication adapter 66, a user interface adapter 67, and a display adapter 68 are also connected to bus 61. Communication adapter 66 provides bus 61 with access to a communication link 72. User interface adapter 67 connects bus 61 to various user devices, such as keyboard 73 and mouse 74, or other device not shown, such as a touch screen, stylus, etc. Display adapter 68 connects bus 61 to a display device 75.

Those of ordinary skill in the art will appreciate that the hardware in FIG. 1B may vary depending on the system implementation. For example, the system may have one or more processors, and other peripheral devices may be used in addition to or in place of the hardware depicted in FIG. 1B. The depicted example is not meant to imply architectural limitations with respect to the present invention. In addition to being able to be implemented on a variety of hardware platforms, the present invention may be implemented in a variety of software environments. A typical operating system may be used to control program execution within the data processing system.

Figure 2:
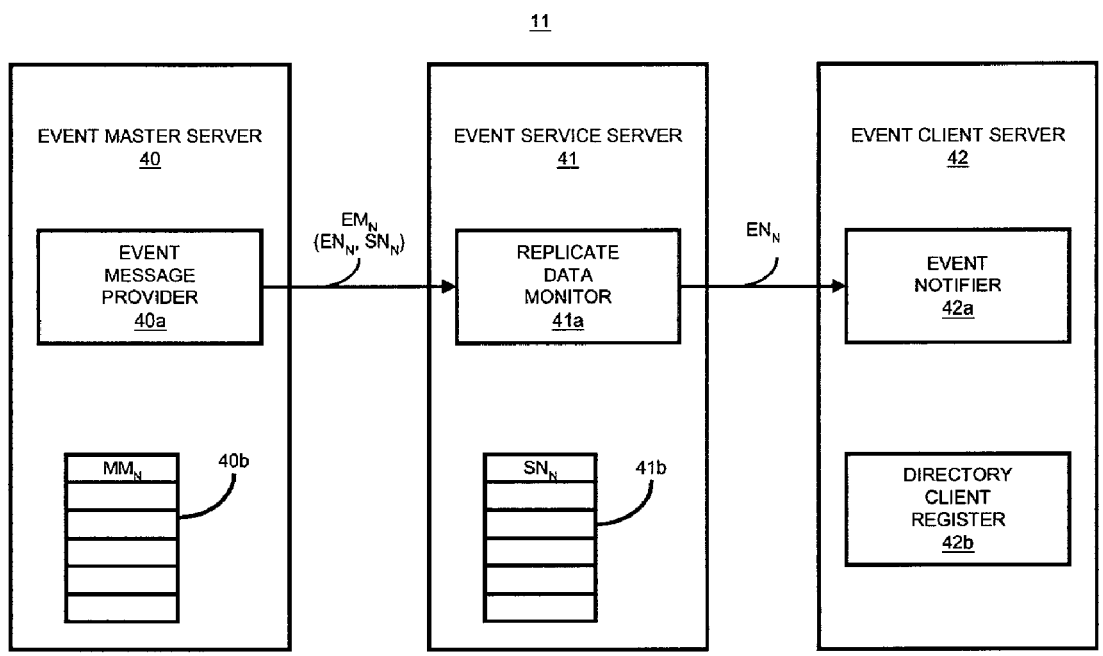
FIG. 2 is a block diagram of an architecture of a directory event system in accordance with the present invention.

Referring to FIGS. 1A and 2, as known by those with ordinary skill in the art, directory service provider server 30 manipulates data within master directory database 31 as directed by a directory data manipulation request from one of directory clients 50a–50i, and master directory database 30 thereafter replicates the manipulated data within master directory database 30 to replicate directory database 31. A directory event system 11 in accordance with the present invention provides event notification(s) to one or more of directory clients 50g–50i upon the manipulation of data in master directory database 31 by directory service provider server 10, and provides the event notification(s) to one or more of directory clients 50a–50f upon a replication of the manipulated data from master directory database 31 to replicate directory database 32. Directory service provider server 30 is therefore not burdened with the task of providing the event notification(s) to directory clients 50a–50i. As a result, directory service provider server 30 is consistently available to timely and effectively handle all directory data manipulation requests from directory clients 50d–50i.

Directory event system 11 will now be described herein as implemented within event master server 40, event service server 41, and event client server 42. However, those of ordinary skill in the art will appreciate software equivalents for event master server 40, event service server 41, and event client server 42.

Directory event system 11 comprises an event message provider 40a and a queue 40b within event master server 40. Directory service provider server 30 operatively shares queue 40b with event message provider 40a. Queue 40b serves as the only link between directory event system 11 and directory service provider server 30 to thereby enable directory event system 11 and directory service provider server 30 to operate independent of each other. Event message provider 40a implements an event message routine 80 in accordance with the present invention as shown in FIG. 3A.

Figure 3A:
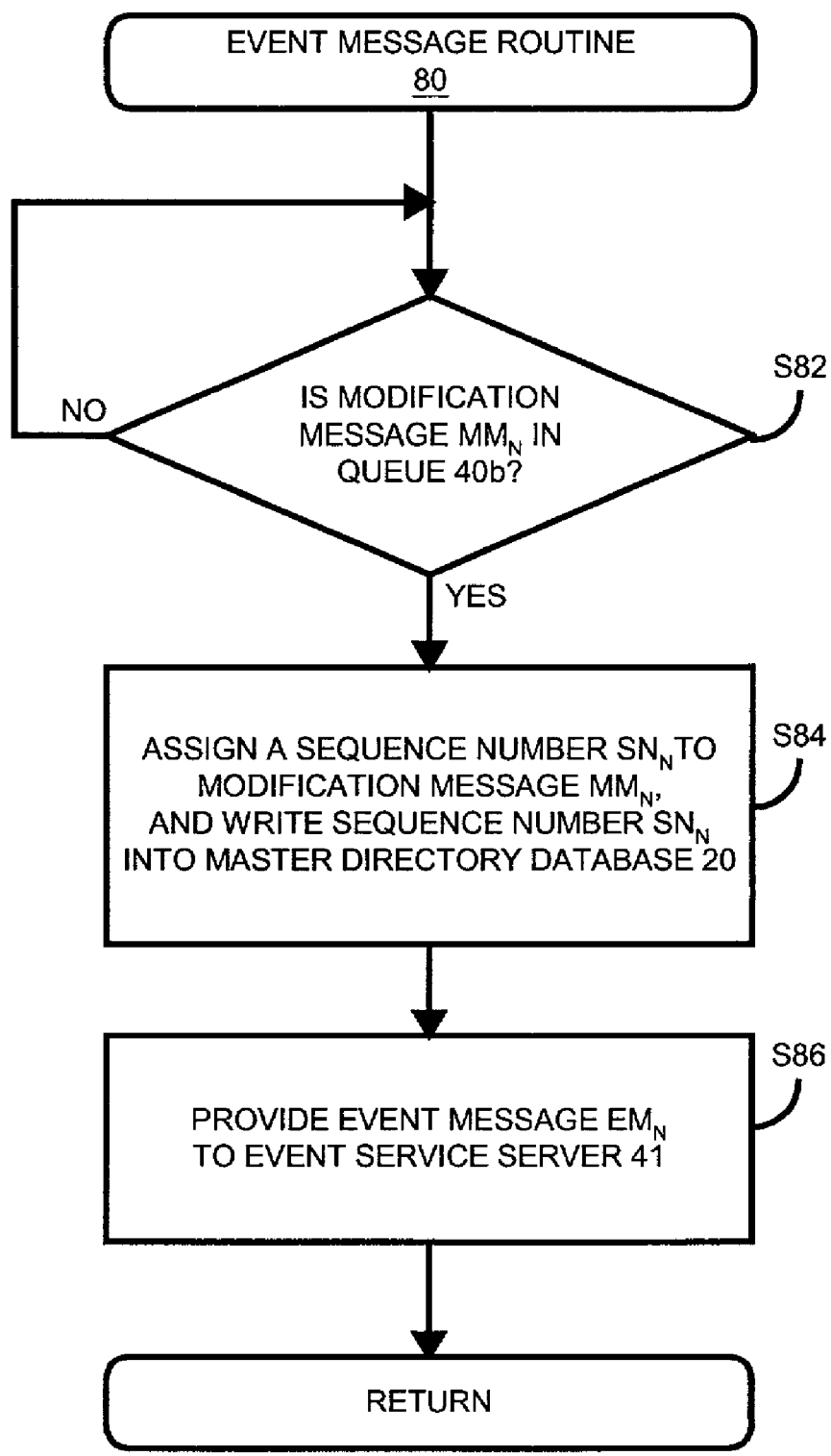
FIG. 3A is flowchart of one embodiment of an event message routine in accordance with the present invention.

Referring additionally to FIG. 3A, during stage S82 of routine 80, event message provider 40a monitors queue 40b to determine if directory service provider server 30 has sent a modification message $MM_N$ to queue 40b. Modification message $MM_N$ is the description of a directory data manipulation request received by directory service provider server 30 and the corresponding manipulated data within master directory database 31. Upon a determination that modification message $MM_N$ is in queue 40b, event message provider 40a proceeds to stage S84 of routine 80 to assign a sequence number $SN_N$ to modification message $MM_N$ and to write sequence number $SN_N$ to master directory database 31. During its next replicate cycle, master directory database 31 replicates all data to replicate directory database 32 to thereby store the manipulated data and sequence number $SN_N$ within replicate directory database 32. Sequence number $SN_N$ serves as a marker indicating the corresponding manipulated data from master directory database 31 is stored within replicate directory database 32.

Event message provider 40a proceeds to stage S86 to provide an event message $EM_N$ to event service server 41. Event message $EM_N$ includes an event notification $EN_N$ that is modification message $MM_N$ or an edited version thereof. Event message $EM_N$ further includes sequence number $SN_N$. Event message provider 40a then returns to stage S82 to await modification message $MM_{N+1}$.

Referring again to FIGS. 1A and 2, directory event system 11 further comprises a replicate data monitor 41a and a queue 41b within event service server 41. In response to event message $EM_N$, replicate data monitor 41a implements an event notification routine 90 in accordance with the present invention as shown in FIG. 3B.

Figure 3B:
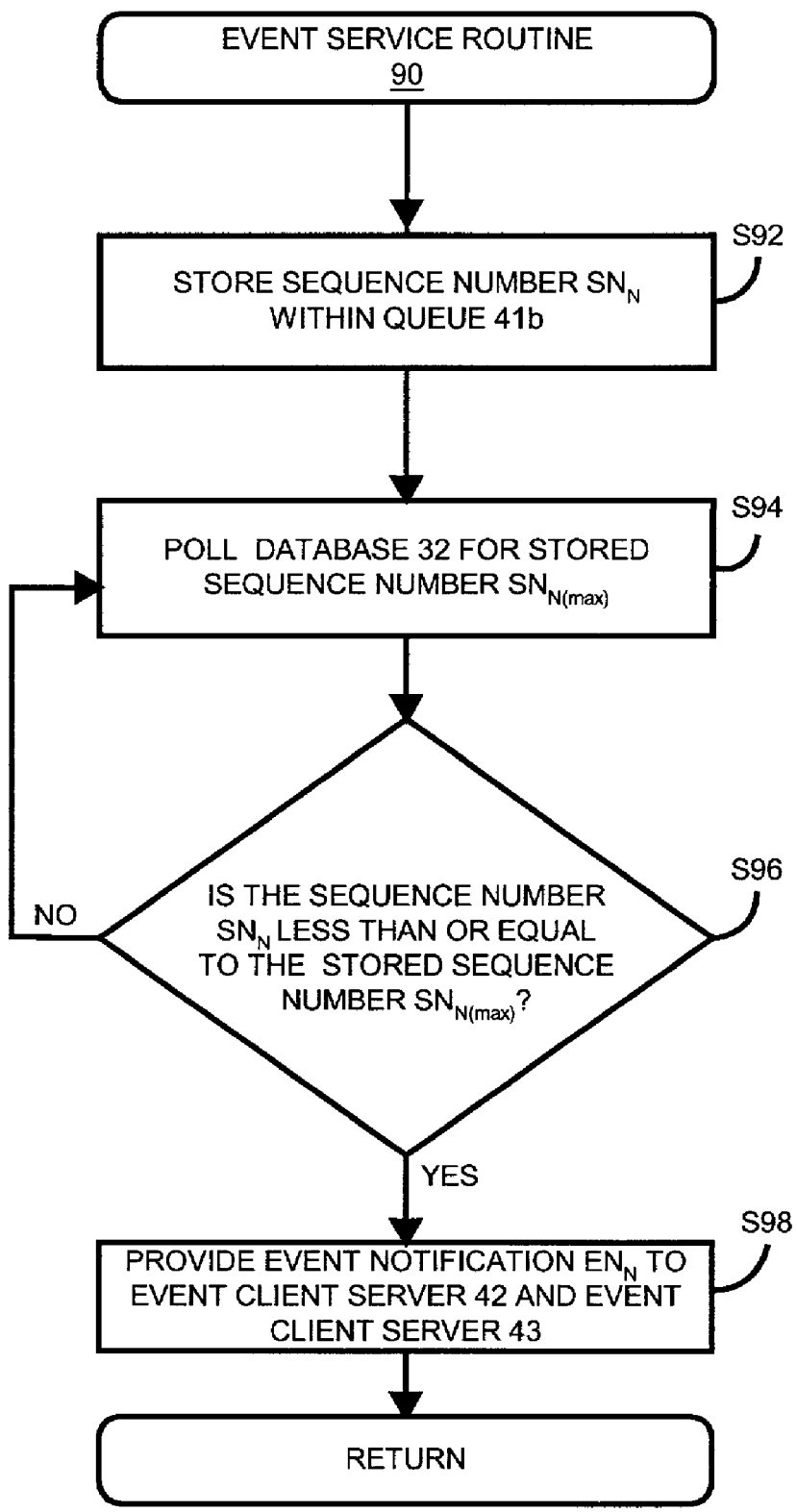
FIG. 3B is flowchart of one embodiment of an event notification routine in accordance with the present invention.

Referring additionally to FIG. 3B, during stage S92 of routine 90, replicate data monitor 41a stores sequence number $SN_N$ within queue 41b. Replicate data monitor 41a proceeds to stage S94 of routine 90 to poll replicate directory database 32 for a sequence number $SN_{MAX}$ stored therein. Those of ordinary skill in the art will appreciate there can be a significant gap of time from a completion of the writing of sequence number $SN_N$ to master directory database 31 by event message provider 40a and a subsequent completion of the replication of all of the data within master directory database 31, including the manipulated data and sequence number $SN_N$, to replicate directory database 32. As such, those of ordinary skill in the art will further appreciate that sequence number $SN_N$ being greater than sequence number $SN_{MAX}$ is an indication that the replication of all of the data within master directory database 31, including the manipulated data and sequence number $SN_N$, has not occurred. Conversely, those of ordinary skill in the art will further appreciate that sequence number $SN_N$ being less than or equal to sequence number $SN_{MAX}$ is an indication that the replication of all of the data within master directory database 31, including the manipulated data and sequence number $SN_N$, has occurred.

Thus, during stage S96 of routine 90, replicate data monitor 41a compares sequence number $SN_N$ and sequence number $SN_{MAX}$ (to determine if sequence number $SN_N$ is less than or equal to sequence number $SN_{MAX}$. If sequence number $SN_N$ is greater than sequence number $SN_{MAX}$, replicate data monitor 41a loops back to stage S94. If sequence number $SN_N$ is less than or equal to sequence number $SN_{MAX}$, replicate data monitor 41a proceeds to stage S98 to provide event notification $EN_N$ (or an edited version thereof) to event client server 42 and event client server 43.

Referring again to FIGS. 1A and 2, directory event system 11 further comprises an event notifier 42a and a directory client register 42b within event client server 42. Each directory client of directory clients 50a–50c selectively registers for one or more event services via directory client register 42b. Event notifier 42a provides event notification $EN_N$ to each directory client 50a–50c that registered for an event service corresponding to event notification $EN_N$. In response to event notification $EN_N$, the registered directory client(s) 50a–50c can immediately poll replicate directory database 32 for the corresponding manipulated data.

Directory event system 11 also comprises an event notifier analogous to event notifier 42a and a directory client register analogous directory client register 42b within event client server 43 and event client server 44. Event client server 43 provides event notification $EN_N$ to the registered directory client(s) 50d 50f in response to event notification $EN_N$ from event service server 41. In response to event notification $EN_N$, the registered directory client(s) 50d–50f can immediately poll replicate directory database 32 for the corresponding manipulated data. Event client server 44 provides event notification $EN_N$ to the registered directory client(s) 50g–50i in response to event notification $EN_N$ from event master server 40. In response to event notification $EN_N$, the registered directory client(s) 50g–50i can immediately poll master directory database 31 for the corresponding manipulated data.

It is important to note that while the present invention has been described in the context of a fully functioning data processing system, those of ordinary skill in the art will appreciate that the processes of the present invention are capable of being distributed in the forms of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, CD-ROM, and transmission-type media, such as digital and analog communications links.

While the embodiments of the present invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

The invention claimed is:

1. A method of processing directory events in a computer, comprising:
   operating a directory service provider server to perform a data manipulation within a master directory database;
   operating an event master server to assign a sequence number to said data manipulation; and
   operating said event master server to store said sequence number within said master directory database;
   operating said event master server to provide an event message to an event service server, said event message including said sequence number and an event notification;
   operating said master database to replicate said sequence number to a replicate directory database; and
   operating, said event service server to provide said event notification to an event client server in response to said replication of said sequence number to said replicate directory database.

2. The method of claim 1, further comprising:
   operating said event client server to provide said event notification to at least one directory client registered to receive said event notification.

3. A system, comprising:
   a master directory database configured to store data;
   a directory service provider server configured to manipulate said data;
   an event master server configured to assign a first sequence number to any manipulation of said data within said master directory database by said directory service provider server, wherein said event master server is further configured to store said first sequence number within said master directory database;
   a replicate directory database configured to store said data, wherein said master directory database is further configured to replicate said data and a second sequence number to said replicate directory database;
   an event service server configured to poi said replicate directory database for said second sequence number in response to said first sequence number from said event master server;
   a directory client; and
   an event client server configured to provide an event notification to said directory client, wherein said event service server is further configured to provide said event notification to said event client server when said first sequence number is less than or equal to said second sequence number.

4. A system comprising
   one or more directory service providers configured to manipulate data stored in at least one master directory database, each data manipulation assigned a sequence number by an event master server and each data manipulation replicated to at least one replicate directory database based on the assigned sequence number; and
   an event client server configured to notify at least one directory client based on the replication to each replicate directory database wherein the directory service provider and a directory event system are linked only a queue,
   wherein the queue stores modification messages, wherein a modification message is stored in the queue, an event message provider assigns a sequence number to the modification message, wherein the sequence number serves as a marker indicating that the corresponding manipulated data from the master directory database is stored within each replicate directory database.

5. The system of claim 4 wherein the event message provider provides an event message to the event service server, the event message including an event notification comprising the modification message or an edited version of the modification message, the event message further including the sequence number.

6. The system of claim 5 further comprising a replicate data monitor, the replicate data monitor configured to poll the replicate directory database for the maximum sequence number, the replicate data monitor further configured to compare the maximum sequence number to a current sequence number to determine whether the current sequence number is equal to or less than the maximum sequence number, and the replicate data monitor configured to provide an event notification to the event client server when the current sequence number is equal to the maximum sequence number.

* * * * *